United States Patent
Lee

(10) Patent No.: US 9,611,779 B2
(45) Date of Patent: Apr. 4, 2017

(54) ACTIVE AIR FLAP AND ELECTRIC THERMOSTAT INTEGRATION CONTROL METHOD AND CONTROL APPARATUS FOR VEHICLE

(71) Applicant: Hyundai Motor Company, Seoul (KR)

(72) Inventor: Jong-Seop Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 71 days.

(21) Appl. No.: 14/800,101

(22) Filed: Jul. 15, 2015

(65) Prior Publication Data

US 2016/0222867 A1 Aug. 4, 2016

(30) Foreign Application Priority Data

Jan. 29, 2015 (KR) ........................ 10-2015-0014203

(51) Int. Cl.
*G05D 1/00* (2006.01)
*F01P 7/02* (2006.01)
*B60K 11/08* (2006.01)

(52) U.S. Cl.
CPC ............ *F01P 7/026* (2013.01); *B60K 11/085* (2013.01)

(58) Field of Classification Search
CPC .............................. F01P 7/026; B60K 11/085
See application file for complete search history.

(56) References Cited

U.S. PATENT DOCUMENTS

| | | | | |
|---|---|---|---|---|
| 3,802,212 A * | 4/1974 | Martin | .................. | F25D 29/001 165/253 |
| 3,836,253 A * | 9/1974 | Colvin | .................... | G01M 3/38 250/574 |
| 3,905,884 A * | 9/1975 | Parenti, Jr. | ................. | C25B 1/04 204/274 |
| 2012/0186296 A1 * | 7/2012 | Gnanendran | ...... | B01D 53/1456 62/637 |
| 2013/0146376 A1 * | 6/2013 | Nam | .................... | B60K 11/085 180/68.1 |
| 2015/0167533 A1 * | 6/2015 | Lee | .......................... | F01P 3/12 123/41.1 |

(Continued)

FOREIGN PATENT DOCUMENTS

JP  2000-161063 A  6/2000
JP  2014-95300 A  5/2014

(Continued)

*Primary Examiner* — Ian Jen
(74) *Attorney, Agent, or Firm* — Morgan, Lewis & Bockius LLP

(57) ABSTRACT

An active air flap and electric thermostat integration control method for a vehicle may include a first control step of controlling opening and closing of an active air flap (AAF) depending on whether the vehicle starts-up, a second control step of controlling opening and closing of an electric thermostat (ETS) and the opening and closing of the AAF according to an engine temperature, a third control step of controlling the opening and closing of the ETS and the opening and closing of the AAF according to an engine load, a fourth control step of controlling the opening and closing of the ETS and the opening and closing of the AAF depending on whether a brake is operated, and a fifth control step, by the ECU, of controlling the opening and closing of the ETS and the opening and closing of the AAF according to a coolant temperature.

13 Claims, 7 Drawing Sheets

(56) References Cited

U.S. PATENT DOCUMENTS

| | | | |
|---|---|---|---|
| 2015/0322845 A1* | 11/2015 | Nam | F02B 29/0443 123/41.21 |
| 2016/0033214 A1* | 2/2016 | Kim | F28F 27/02 165/287 |
| 2016/0108795 A1* | 4/2016 | Kim | F04D 15/0088 701/102 |
| 2016/0222867 A1* | 8/2016 | Lee | B60K 11/085 |

FOREIGN PATENT DOCUMENTS

| | | |
|---|---|---|
| KR | 10-2010-0046974 A | 5/2010 |
| KR | 10-2011-0021021 A | 3/2011 |
| KR | 10-2011-0026845 A | 3/2011 |
| KR | 10-1240975 B1 | 3/2013 |
| KR | 10-1316230 B1 | 10/2013 |
| KR | 10-1459970 B1 | 11/2014 |

\* cited by examiner

FIG.2(Prior Art)

| IGNITION | ETS | ENGINE | BRAKE SIGNAL | Temp. COOLANT | AAF | ETS |
|---|---|---|---|---|---|---|
| OFF | X | X | X | X | CLOSE | X |
| ON | CLOSE | TARGET ≤ ENGINE_LOAD | X | X | CLOSE | CLOSE |
| ON | OPEN | ENGINE_LOAD <TARGET | OFF | X | OPEN | OPEN |
| ON | OPEN | ENGINE_LOAD <TARGET | OFF | Temp.<TARGET−α | CLOSE | OPEN |
| ON | OPEN | ENGINE_LOAD <TARGET | OFF | TARGET−α<=Temp.<TARGET+α | OLD | OPEN |
| ON | OPEN | ENGINE_LOAD <TARGET | OFF | TARGET+α<=Temp. | OPEN | OPEN |
| ON | OPEN | ENGINE_LOAD <TARGET | ON | Temp.<TARGET−α | OPEN | CLOSE |
| ON | OPEN | ENGINE_LOAD <TARGET | ON | TARGET−α<=Temp.<TARGET+α | OPEN | OLD |
| ON | OPEN | ENGINE_LOAD <TARGET | ON | TARGET+α<=Temp. | OPEN | OPEN |

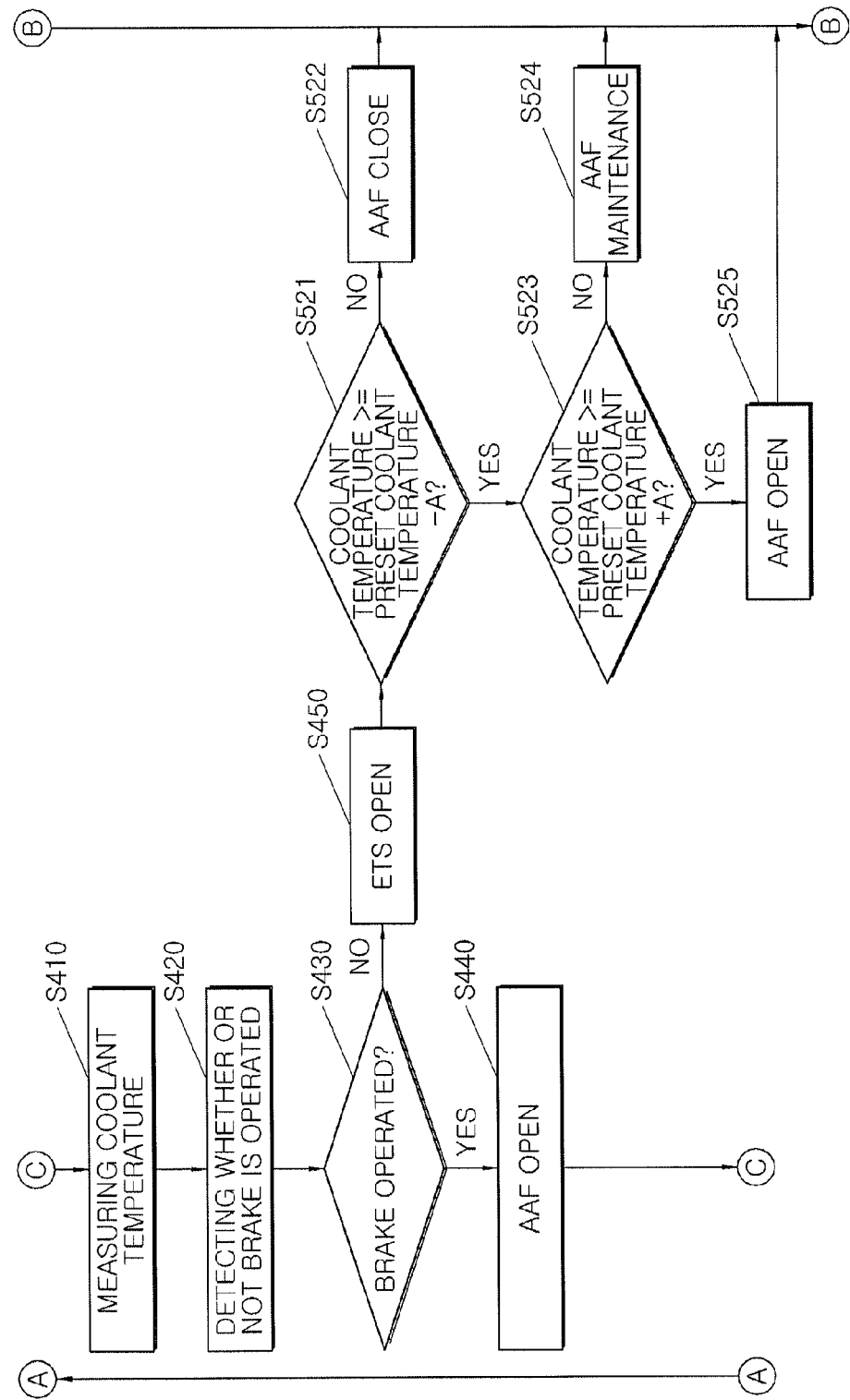

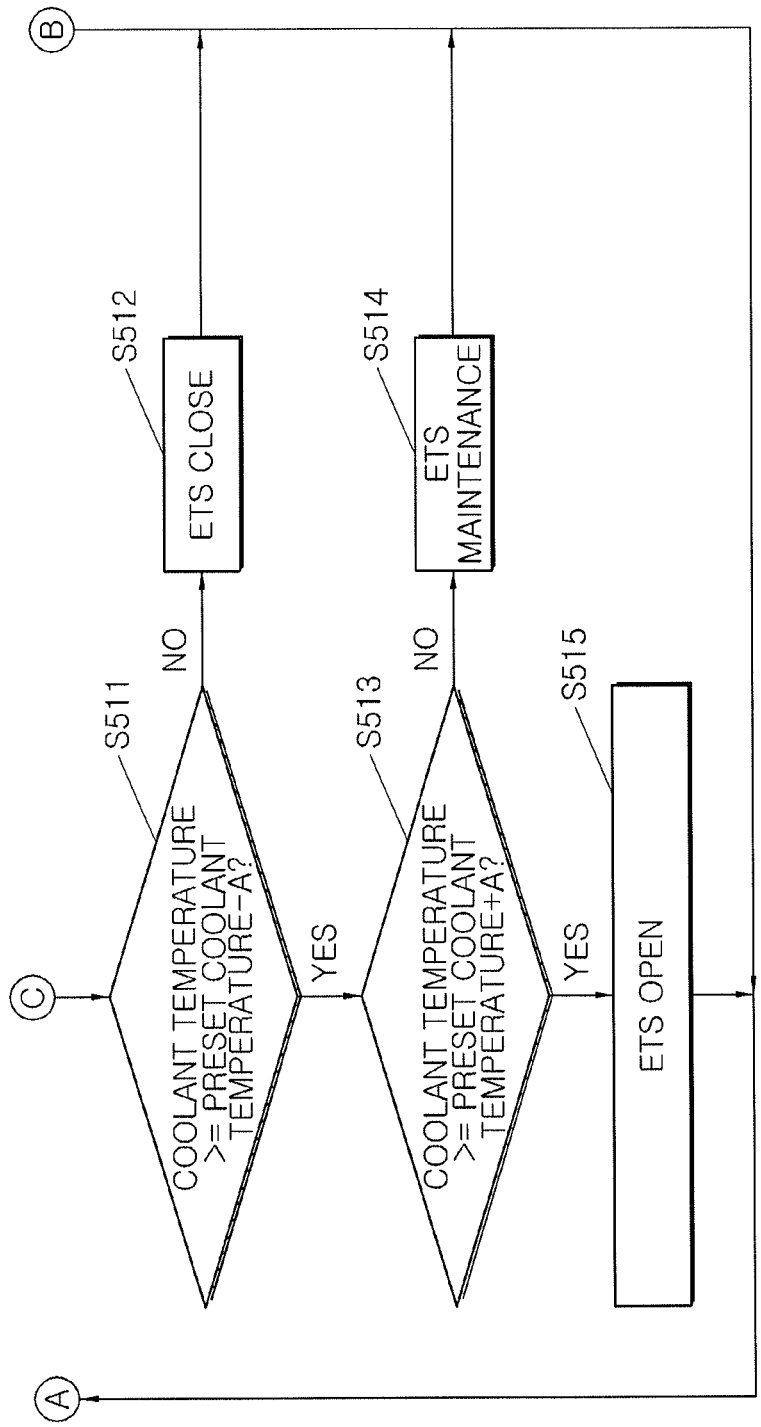

ACTIVE AIR FLAP AND ELECTRIC THERMOSTAT INTEGRATION CONTROL METHOD AND CONTROL APPARATUS FOR VEHICLE

CROSS-REFERENCE TO RELATED APPLICATION

The present application claims priority to Korean Patent Application No. 10-2015-0014203, filed Jan. 29, 2015, the entire contents of which is incorporated herein for all purposes by this reference.

BACKGROUND OF THE INVENTION

Field of the Invention

The present invention relates to an active air flap (AAF) and electric thermostat (ETS) integration control method and control apparatus for vehicle, and more particularly, to an active air flap and an electric thermostat integration control method and control apparatus for vehicle, which control an active air flap and electric thermostat in an integrated manner for optimal aerodynamic control while ensuring the cooling amount.

Description of Related Art

FIG. 1 is a schematic diagram representing a heat management system of a vehicle according to the related art. Referring to FIG. 1, the fuel efficiency of the vehicle has been recently highlighted due to rising in oil prices and reduction of petroleum resources, and thus many techniques have been studied regarding a diesel engine and HEV (Hybrid Electric Vehicle) and the like for the fuel efficiency improvement. Among the techniques, research for reducing the loss of the driving system through the heat management system of the vehicle has also been conducted. As one of them, the research using an integrated heat management control of a cooling module including a radiator, a motor driven cooling fan, a water pump, a thermostat and the like has been actively conducted.

The radiator is mounted to a front portion of the vehicle and cools the coolant by using external air flow caused by the running of the vehicle. Also, vent holes (radiator grill) are provided to the front portion of the vehicle in order to ensure the cooling amount of the radiator while the vehicle is driving.

The AAF among an active aerodynamic control device adjusts an aerodynamics by opening and closing the vent holes of the vehicle. This is to determine whether the cooling of an engine and a driving system is necessary by using input values such as the coolant temperature and the like, and according to determination results thereof, decide whether or not to open and close the AAF.

Since such the conventional AAF is opened or closed according to the coolant temperature, there has been a problem that the coolant has been overheated due to the rapid increase in the load of the engine by road conditions or driving habits of a driver and the like after the AAF is closed.

According to this, there has occurred a problem that power consumption for cooling the coolant has been significantly elevated, and thereafter, the loss of aerodynamic performance has been occurred such that the fuel efficiency loss of the vehicle has also been encountered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active air flap and electric thermostat integration control method and control apparatus for a vehicle capable of reducing power consumption of a cooling module while maintaining the aerodynamic performance improvement.

According to various aspects of the present invention, an active air flap and electric thermostat integration control method for a vehicle, may include a first control step, by a controller, of controlling opening and closing of an active air flap (AAF) depending on whether the vehicle starts-up, a second control step, by the controller, of controlling opening and closing of an electric thermostat (ETS) and the opening and closing of the AAF according to an engine temperature, a third control step, by the controller, of controlling the opening and closing of the ETS and the opening and closing of the AAF according to an engine load, a fourth control step, by the controller, of controlling the opening and closing of the ETS and the opening and closing of the AAF depending on whether a brake is operated, and a fifth control step, by the controller, of controlling the opening and closing of the ETS and the opening and closing of the AAF according to a coolant temperature.

The first control step may include a first determination step of determining whether or not the vehicle starts up, and a first AAF closure step of closing the AAF when it is determined at the first determination step that the starting of vehicle is off.

The second control step may include a first measurement step of measuring the engine temperature when it is determined at the first determination step that the starting of the vehicle is on, a second determination step of determining whether the engine temperature measured at the first measurement step is less than a preset engine temperature, and a first ETS closure step of closuring the ETS and a second AAF closure step of closing the AAF when it is determined at the second determination step that the measured engine temperature is less than the preset engine temperature.

The third control step may include a second measurement step of measuring an engine load when it is determined at the second determination step that the measured engine temperature is equal to or more than the preset engine temperature, a third determination step of determining whether the engine load measured at the second measurement step is less than a preset engine load, and a first ETS open step of opening the ETS and a first AAF open step of opening the AAF when it is determined at the third determination step that the measured engine load is equal to or more than the preset engine load.

The fourth control step may include a fifth measurement step of measuring the coolant temperature and a first detection step of detecting a brake operation signal when it is determined at the third determination step that the measured engine load is less than the preset engine load, a fourth determination step of determining whether the brake is operated according to the brake operation signal detected at the first detection step, and a second AAF open step of opening the AAF when it is determined at the fourth determination step that the brake is operated.

The fifth control step may include a fifth determination step of determining whether the coolant temperature measured at the fifth measurement step after the second AAF open step is equal to or more than the difference between the preset coolant temperature and a coolant temperature margin, and a second ETS closure step of closuring the ETS when it is determined at the fifth determination step that the measured coolant temperature is less than the difference between the preset coolant temperature and the coolant temperature margin.

The fifth control step may further include a sixth determination step of determining whether the measured coolant temperature is equal to or more than the sum of the preset coolant temperature and the coolant temperature margin when it is determined at the fifth determination step that the measured coolant temperature is equal to or more than the difference between the preset coolant temperature and the coolant temperature margin, and an ETS state maintenance step of maintaining the open state or the closure state of the ETS when it is determined at the sixth determination step that the measured coolant temperature is less than the sum of the preset coolant temperature and the coolant temperature margin.

The fifth control step may further include a second ETS open step of opening the ETS when it is determined at the sixth determination step that the measured coolant temperature is equal to or more than the sum of the preset coolant temperature and the coolant temperature margin.

The fourth control step may further include a third ETS open step of opening the ETS when it is determined at the fourth determination step that the brake is not operated.

The fifth control step may include a seventh determination step of determining whether the coolant temperature measured at the fifth measurement step is equal to or more than the difference of the preset coolant temperature and the coolant temperature margin after the third ETS open step, and a third AAF closure step of closing the AAF when it is determined at the seventh determination step that the measured coolant temperature is less than the difference of the preset coolant temperature and the coolant temperature margin.

The fifth control step may further include an eighth determination step of determining whether the measured coolant temperature is equal to or more than the sum of the preset coolant temperature and the coolant temperature margin when it is determined at the seventh determination step that the measured coolant temperature is equal to or more than the difference of the preset coolant temperature and the coolant temperature margin, and an AAF state maintenance step of maintaining the open state or the closure state of the AAF when it is determined at the eighth determination step that the measured coolant temperature is less than the sum of the preset coolant temperature and the coolant temperature margin.

The fifth control step may further include a third AAF open step of opening the AAF when it is determined at the eighth determination step that the measured coolant temperature is equal to or more than the sum of the preset coolant temperature and the coolant temperature margin.

According to various aspects of the present invention, an active air flap and electric thermostat integration control apparatus for a vehicle may include a measurement device having at least one engine temperature measurement device, an engine load measurement device, a brake operation signal detection device or a coolant temperature measurement device, an ETS for opening and closing a coolant passage flowing into an engine from a radiator, an AAF for adjusting an aerodynamics by opening and closing vent holes of the vehicle, and an Engine Control Unit (ECU) for receiving a signal of the measurement device and controlling opening and closing of the ETS and opening and closing of the AAF according to an active air flap and electric thermostat integration control method for the vehicle, including a first control step of controlling opening and closing of the AAF depending on whether the vehicle starts-up, a second control step of controlling opening and closing of the ETS and the opening and closing of the AAF according to an engine temperature, a third control step of controlling the opening and closing of the ETS and the opening and closing of the AAF according to an engine load, a fourth control step of controlling the opening and closing of the ETS and the opening and closing of the AAF depending on whether a brake is operated, and a fifth control step of controlling the opening and closing of the ETS and the opening and closing of the AAF according to a coolant temperature.

As described above, according to the present invention, the AAF is opened to cause the coolant to be cooled in the radiator while a vehicle is decelerated, thereby reducing the power consumption of a cooling module in the driving situations after decelerated.

According to this, since it is possible to increase the closure time of the AAF when the vehicle is reaccelerated after decelerated, the aerodynamic performance may be improved when reaccelerated. Thus, the fuel efficiency of the vehicle may be further improved.

It is understood that the term "vehicle" or "vehicular" or other similar teams as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a diagram explaining an exemplary active air flap and electric thermostat integration control method for a vehicle according to the present invention.

FIG. 4A, FIG. 4B and FIG. 4C are a detailed flowchart of an exemplary active air flap and electric thermostat integration control method for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
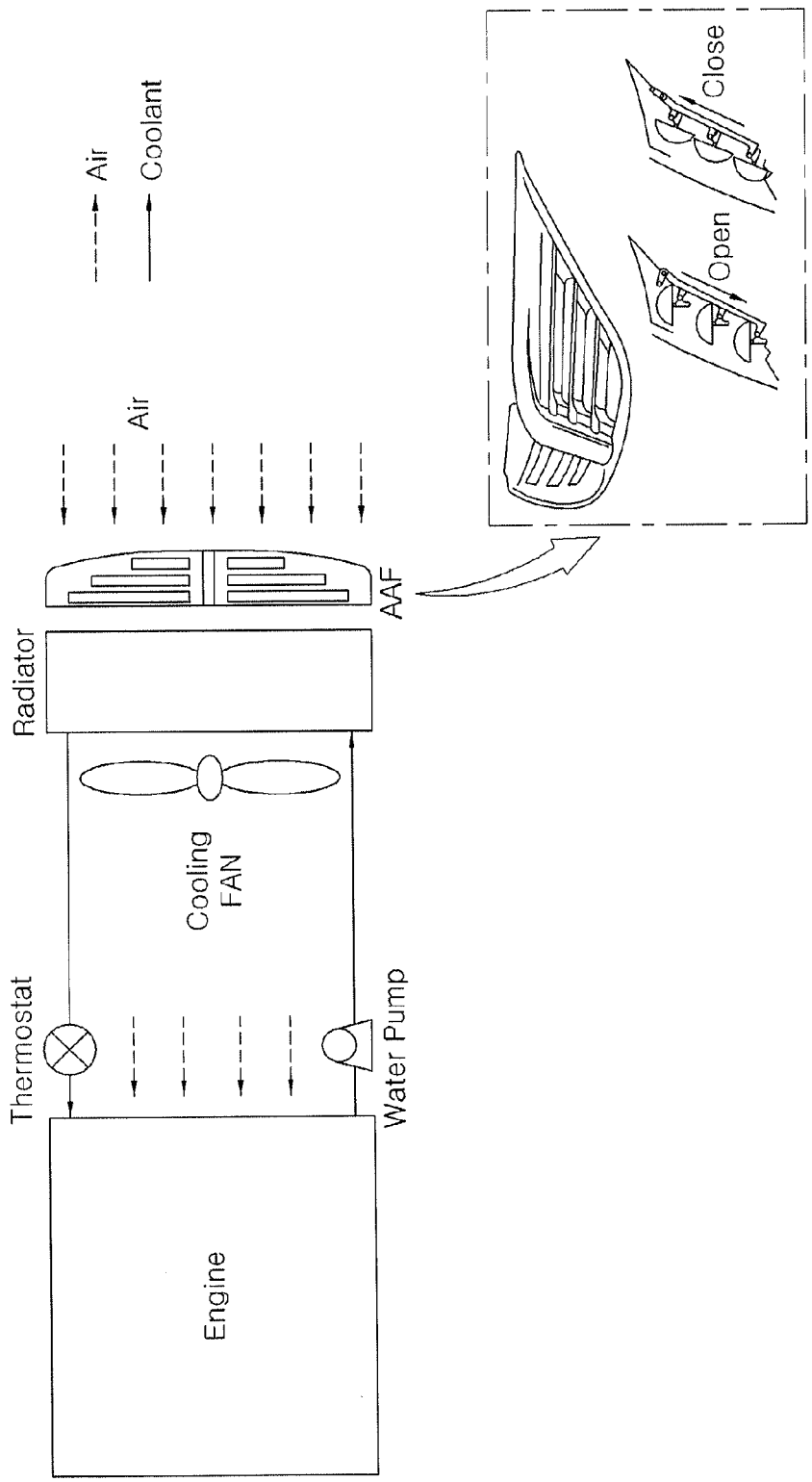
FIG. 1 is a schematic diagram of a heat management system of a vehicle according to the prior art.
Figure 3:
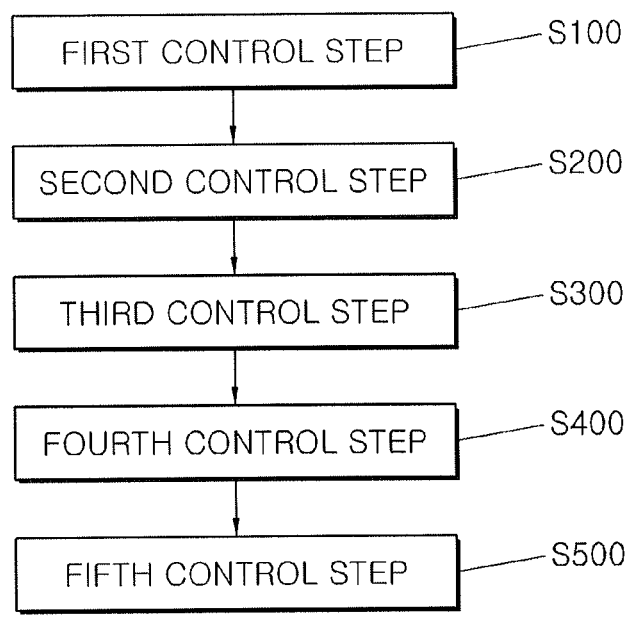
FIG. 3 is a schematic flow chart of an exemplary active air flap and electric thermostat integration control method for a vehicle according to the present invention.
Figure 4A:
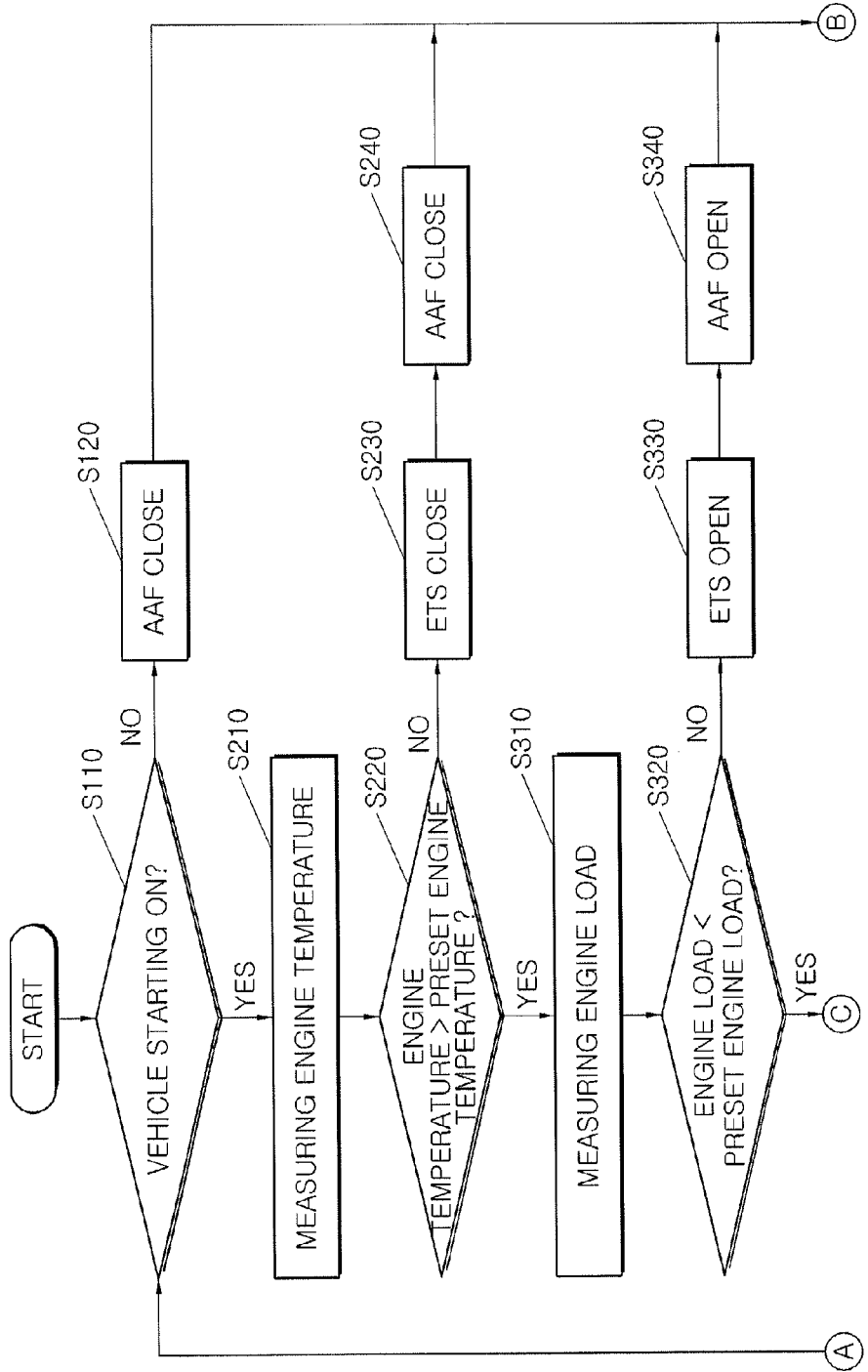

FIG. 2 is a diagram explaining an active air flap and electric thermostat integration control method according to various embodiments of the present invention, FIG. 3 is a schematic flow chart of an active air flap and electric thermostat integration control method according to various embodiments of the present invention, FIGS. 4A, 4B and 4C are a detailed flow chart of an active air flap and electric thermostat integration control method according to various embodiments of the present invention. In FIG. 2, "X" refers to irrelevance to conditions and "OLD" refers to prior state maintenance.

Referring to FIG. 2 to FIG. 4C, an active air flap and electric thermostat integration control method according to the present invention may include a first control step S100 of controlling opening and closing of an AAF (active air flap) 300 depending on whether a vehicle starts-up, a second control step S200 of controlling opening and closing of an ETS (electric thermostat) 200 and the opening and closing of the AAF 300 according to an engine temperature, a third control step S300 of controlling the opening and closing of the ETS 200 and the opening and closing of the AAF 300 according to an engine load, a fourth control step S400 of controlling the opening and closing of the ETS 200 and the opening and closing of the AAF 300 depending on whether a brake is operated, and a fifth control step S500 of controlling the opening and closing of the ETS 300 and the opening and closing of the AAF 200 according to a coolant temperature.

The first control step S100 may include a first determination step S110 of determining whether or not the vehicle starts up, and a first AAF closure step S120 of closing the AAF 300 when it is determined at the first determination step S110 that the starting of vehicle is off. That is, this is to close immediately the AAF 300 without determining other conditions in a state that the starting of vehicle is off, thereby capable of preventing foreign matter such as dust and the like from being flowed into the inside of a vehicle in the state that the starting of vehicle is off.

The second control step S200 may include a first measurement step S210 of measuring the engine temperature when it is determined at the first determination step S110 that the starting of the vehicle is on, and a second determination step S220 of determining whether the engine temperature measured at the first measurement step S210 is less than a preset engine temperature. That is, this is to determine whether or not the engine is cooled by measuring the engine temperature. The preset engine temperature may be a reference temperature of the engine cooling-state determination and set usually as 80°~90°, but not limited thereto and set variably according to the vehicle performance, and the like.

The second control step S200 may include a first ETS closure step S230 of closing the ETS 200 and a second AAF closure step S240 of closing the AAF 300 when it is determined at the second determination step S220 that the measured engine temperature is less than the preset engine temperature. That is, the warm-up of the engine is required because the engine is in a cooled state when it is determined that the measured engine temperature is less than the preset engine temperature. Thus, by closing the ETS 200, the coolant cooled by a radiator is blocked not to flow into the engine. Further, by closing the AAF 300, the aerodynamic performance may be risen-up and the fuel efficiency of the vehicle may be improved.

The third control step S300 may include a second measurement step S310 of measuring an engine load when it is determined at the second determination S220 that the measured engine temperature is equal to or more than the preset engine temperature, a third determination step S320 of determining whether the engine load measured at the second measurement step S310 is less than a preset engine load. That is, this is to prepare for rapid overheating of the coolant due to the increase of the engine load by measuring the engine load when it is determined that the engine is not in the cooled state.

The third control step S300 may include a first ETS open step S330 of opening the ETS 200 and a first AAF open step S340 of opening the AAF 300 when it is determined at the third determination step S320 that the measured engine load is equal to or more than the preset engine load. That is, since there is a possibility of rapid overheating of the coolant due to the increase of the engine load, it makes the coolant cooled at the radiator to be flowed into the engine in order to cool the engine by opening the ETS 200. Further, by opening the AAF 300, it makes the coolant passing through the radiator to be cooled by using external air flow caused by the vehicle running. Thus, it may be possible to prevent the overheating state of the coolant due to the increase of the engine load. Furthermore, it is able to prevent the power consumption of a cooling module for cooling the overheated coolant from being risen significantly, and thereafter, since it can prevent the aerodynamic performance from being lost due to the open time increase of the AAF 300, thereby improving the fuel efficiency of the vehicle.

The fourth control step S400 may include a fifth measurement step S410 of measuring the coolant temperature and a first detection step S420 of detecting a brake operation signal when it is determined at the third determination step S320 that the measured engine load is less than the preset engine load. That is, in the case that there is no possibility of the rapid overheating of the coolant due to the increase of the engine load, the firth measurement step S410 and the first detection step S420 are performed in order to control the AAF 300 and the ETS 200 depending on the current coolant temperature and whether the brake is operated.

The fourth control step S400 may include a fourth determination step S430 of determining whether the brake is operated according to the brake operation signal detected at the first detection step S420 and a second AAF open step S440 of opening the AAF 300 when it is determined at the fourth determination step S430 that the brake is operated. That is, since the aerodynamic loss is not generated while the vehicle is decelerated, it makes the AAF 300 to be opened regardless of the coolant temperature so that the coolant passing through the radiator may be cooled by the external air flow occurred while the vehicle is running. Thus, it is possible to sufficiently ensure the cooling amount of the coolant at the radiator when needed to reaccelerate the vehicle and since it is able to increase the closure time of the AAF 300 when reaccelerating after decelerated, thereby improving the aerodynamic performance when reaccelerating.

The fifth control step S500 may include a fifth determination step S511 of determining whether the coolant temperature measured at the fifth measurement step S410 after the second AAF open step S440 is equal to or more than the difference between the preset coolant temperature and a coolant temperature margin A, and a second ETS closure step S512 of closuring the ETS 200 when it is determined at the fifth determination step S511 that the measured coolant temperature is less than the difference between the preset coolant temperature and a coolant temperature margin A. That is, since viscosity of the engine oil is increased below a certain temperature, there is a problem that the fuel efficiency of the vehicle falls down by the engine friction in extremely low engine temperature. Thus, in the case that the measured coolant temperature is too low, the ETS 200 is closed in order to prevent the coolant cooled by the radiator from being flowed into the inside of the engine. The preset coolant temperature and the coolant temperature margin A may be set variably according to the vehicle performance and the like.

The fifth control step S500 may include a sixth determination step S513 of determining whether the measured coolant temperature is equal to or more than the sum of the preset coolant temperature and the coolant temperature margin A when it is determined at the fifth determination step S511 that the measured coolant temperature is equal to or more than the difference between the preset coolant temperature and the coolant temperature margin A, and an ETS state maintenance step S514 of maintaining the open state or closure state of the ETS 200 when it is determined at the sixth determination S513 that the measured coolant temperature is less than the sum of the preset coolant temperature and the coolant temperature margin A. That is, in the case that the measured coolant temperature is within the coolant temperature margin A at the preset coolant temperature, the ETS 200 is maintained with opened or closed state. This is to prevent the durability deterioration of components associated with the ETS 200 due to the too frequent open and closure of the ETS 200.

The fifth control step S500 may include a second ETS open step S515 of opening the ETS 200 when it is determined at the sixth determination step S513 that the measured coolant temperature is equal to or more than the sum of the preset coolant temperature and the coolant temperature margin A. That is, in the case that the measured coolant temperature is too high, the ETS 200 is opened in order for the coolant cooled by the radiator to be flowed into the inside of the engine.

The fourth control step S400 may include a third ETS open step S450 of opening the ETS 200 when it is determined at the fourth determination step S430 that the brake is not operated. That is, since it is necessary to continue to cool the engine when the brake is not operated, the ETS 200 is opened in order for the coolant cooled by the radiator to be flowed into the inside of the engine.

The fifth control step S500 may include a seventh determination step S521 of determining whether the coolant temperature measured at the fifth measurement step S410 is equal to or more than the difference of the preset coolant temperature and the coolant temperature margin A after the third ETS open step S450, and a third AAF closure step S522 of closing the AAF 300 when it is determined at the seventh determination step S521 that the measured coolant temperature in the engine is less than the difference of the preset coolant temperature and the coolant temperature margin A. That is, since the engine can be cooled sufficiently by the coolant cooled at the radiator, the AAF 300 is closed, thereby improving the aerodynamic performance and the fuel efficiency of the vehicle.

The fifth control step S500 may include an eighth determination step S523 of determining whether the measured coolant temperature in the engine is equal to or more than the sum of the preset coolant temperature and the coolant temperature margin A when it is determined at the seventh determination step S521 that the measured coolant temperature in the engine is equal to or more than the difference of the preset coolant temperature and the coolant temperature margin A, and an AAF state maintenance step S524 of maintaining the open state or closure state of the AAF 300 when it is determined at the eighth determination step S523 that the measure coolant temperature in the engine is less than the sum of the preset coolant temperature and the coolant temperature margin A. That is, in the case that the measured coolant temperature is within the coolant temperature margin A at the preset coolant temperature, the AAF 300 is maintained with the open state or the closure state. This is to prevent the durability deterioration of components associated with the AAF 300 due to the too frequent open and closure of the AAF 300.

The fifth control step S500 may include a third AAF open step S525 of opening the AAF 300 when it is determined at the eighth determination step S523 that the measured coolant temperature in the engine is equal to or more than the sum of the preset coolant temperature and the coolant temperature margin A. That is, in the case that the measured coolant temperature is too high, the AAF 300 is opened in order for the coolant passing through the radiator to be cooled sufficiently.

Figure 5:
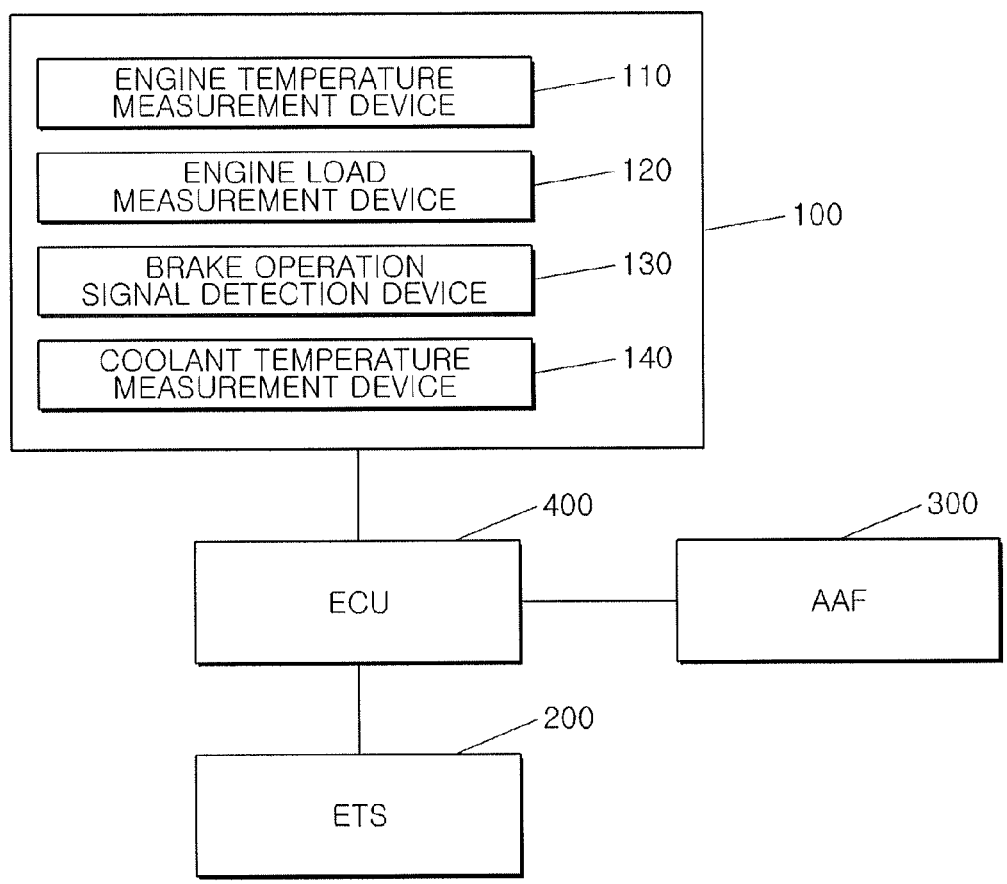
FIG. 5 is a block diagram of an exemplary active air flap and electric thermostat integration control apparatus for a vehicle according to the present invention.

FIG. 5 is a block diagram of an active air flap and electric thermostat integration control apparatus for a vehicle according to various embodiments of the present invention. Referring to FIG. 5, the active air flap and electric thermostat integration control apparatus for a vehicle according to various embodiments of the present invention may include a measurement device 100 having any one or more of an engine temperature measurement device 110, an engine load measurement device 120, a brake operation signal detection device 130 or a coolant temperature measurement device 140, an ETS 200 for opening and closing a coolant passage flowing into an engine from a radiator, an AAF 300 for adjusting an aerodynamics by opening and closing vent holes of a vehicle, a storage medium in which an active air flap and electric thermostat integration control method for a vehicle is saved, and an Engine Control Unit (ECU) for receiving a signal of the measurement device 100 and controlling the opening and closing of the ETS 200 and AAF 300 according to the control method saved in the storage medium 500.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap and electric thermostat integration control method for a vehicle, comprising:
   a first control step, by a controller, of controlling opening and closing of an active air flap (AAF) depending on whether the vehicle starts-up;
   a second control step, by the controller, of controlling opening and closing of an electric thermostat (ETS) and the opening and closing of the AAF according to an engine temperature;
   a third control step, by the controller, of controlling the opening and closing of the ETS and the opening and closing of the AAF according to an engine load;
   a fourth control step, by the controller, of controlling the opening and closing of the ETS and the opening and closing of the AAF depending on whether a brake is operated; and
   a fifth control step, by the controller, of controlling the opening and closing of the ETS and the opening and closing of the AAF according to a coolant temperature.

2. The method as defined in claim 1, wherein the first control step includes:
   a first determination step of determining whether or not the vehicle starts up; and
   a first AAF closure step of closing the AAF when it is determined at the first determination step that a starting of the vehicle is off.

3. The method as defined in claim 2, wherein the second control step includes:
   a first measurement step of measuring the engine temperature when it is determined at the first determination step that the starting of the vehicle is on;
   a second determination step of determining whether the engine temperature measured at the first measurement step is less than a preset engine temperature; and
   a first ETS closure step of closuring the ETS and a second AAF closure step of closing the AAF when it is determined at the second determination step that the measured engine temperature is less than the preset engine temperature.

4. The method as defined in claim 3, wherein the third control step includes:
   a second measurement step of measuring an engine load when it is determined at the second determination step that the measured engine temperature is equal to or more than the preset engine temperature;
   a third determination step of determining whether the engine load measured at the second measurement step is less than a preset engine load; and
   a first ETS open step of opening the ETS and a first AAF open step of opening the AAF when it is determined at the third determination step that the measured engine load is equal to or more than the preset engine load.

5. The method as defined in claim 4, wherein the fourth control step includes:
   a fifth measurement step of measuring the coolant temperature and a first detection step of detecting a brake operation signal when it is determined at the third determination step that the measured engine load is less than the preset engine load;
   a fourth determination step of determining whether the brake is operated according to the brake operation signal detected at the first detection step; and
   a second AAF open step of opening the AAF when it is determined at the fourth determination step that the brake is operated.

6. The method as defined in claim 5, wherein the fifth control step includes:
   a fifth determination step of determining whether the coolant temperature measured at the fifth measurement step after the second AAF open step is equal to or more than a difference between the preset coolant temperature and a coolant temperature margin; and
   a second ETS closure step of closuring the ETS when it is determined at the fifth determination step that the measured coolant temperature is less than the difference between the preset coolant temperature and the coolant temperature margin.

7. The method as defined in claim 6, wherein the fifth control step further includes:
   a sixth determination step of determining whether the measured coolant temperature is equal to or more than a sum of the preset coolant temperature and the coolant temperature margin when it is determined at the fifth determination step that the measured coolant temperature is equal to or more than the difference between the preset coolant temperature and the coolant temperature margin; and
   an ETS state maintenance step of maintaining the open state or the closure state of the ETS when it is determined at the sixth determination step that the measured coolant temperature is less than the sum of the preset coolant temperature and the coolant temperature margin.

8. The method as defined in claim 7, wherein the fifth control step further includes a second ETS open step of opening the ETS when it is determined at the sixth determination step that the measured coolant temperature is equal to or more than the sum of the preset coolant temperature and the coolant temperature margin.

9. The method as defined in claim 5, wherein the fourth control step further includes a third ETS open step of opening the ETS when it is determined at the fourth determination step that the brake is not operated.

10. The method as defined in claim 9, wherein the fifth control step includes:
    a seventh determination step of determining whether the coolant temperature measured at the fifth measurement step is equal to or more than the difference of the preset coolant temperature and the coolant temperature margin after the third ETS open step; and
    a third AAF closure step of closing the AAF when it is determined at the seventh determination step that the measured coolant temperature is less than the difference of the preset coolant temperature and the coolant temperature margin.

11. The method as defined in claim 10, wherein the fifth control step further includes:
    a eighth determination step of determining whether the measured coolant temperature is equal to or more than the sum of the preset coolant temperature and the coolant temperature margin when it is determined at the seventh determination step that the measured coolant temperature is equal to or more than the difference of the preset coolant temperature and the coolant temperature margin; and
    an AAF state maintenance step of maintaining the open state or the closure state of the AAF when it is determined at the eighth determination step that the measured coolant temperature is less than the sum of the preset coolant temperature and the coolant temperature margin.

12. The method as defined in claim 11, wherein the fifth control step further includes a third AAF open step of opening the AAF when it is determined at the eighth determination step that the measured coolant temperature is equal to or more than the sum of the preset coolant temperature and the coolant temperature margin.

13. An active air flap and electric thermostat integration control apparatus for a vehicle, comprising:
   a measurement device having at least one engine temperature measurement device, an engine load measurement device, a brake operation signal detection device or a coolant temperature measurement device;
   an electric thermostat (ETS) for opening and closing a coolant passage flowing into an engine from a radiator;
   an active air flap (AAF) for adjusting an aerodynamics by opening and closing vent holes of the vehicle; and
   a controller for receiving a signal of the measurement device and controlling opening and closing of the ETS and opening and closing of the AAF according to an active air flap and electric thermostat integration control method for the vehicle, comprising:
   a first control step of controlling the opening and closing of the AAF depending on whether the vehicle starts-up;
   a second control step of controlling the opening and closing of the ETS and the opening and closing of the AAF according to an engine temperature;
   a third control step of controlling the opening and closing of the ETS and the opening and closing of the AAF according to an engine load;
   a fourth control step of controlling the opening and closing of the ETS and the opening and closing of the AAF depending on whether a brake is operated; and
   a fifth control step of controlling the opening and closing of the ETS and the opening and closing of the AAF according to a coolant temperature.

* * * * *